A. C. BROWN & W. K. MONROE.
APPARATUS FOR HANDLING MATERIAL.
APPLICATION FILED MAY 28, 1917.
1,236,047.
Patented Aug. 7, 1917.
2 SHEETS—SHEET 1.
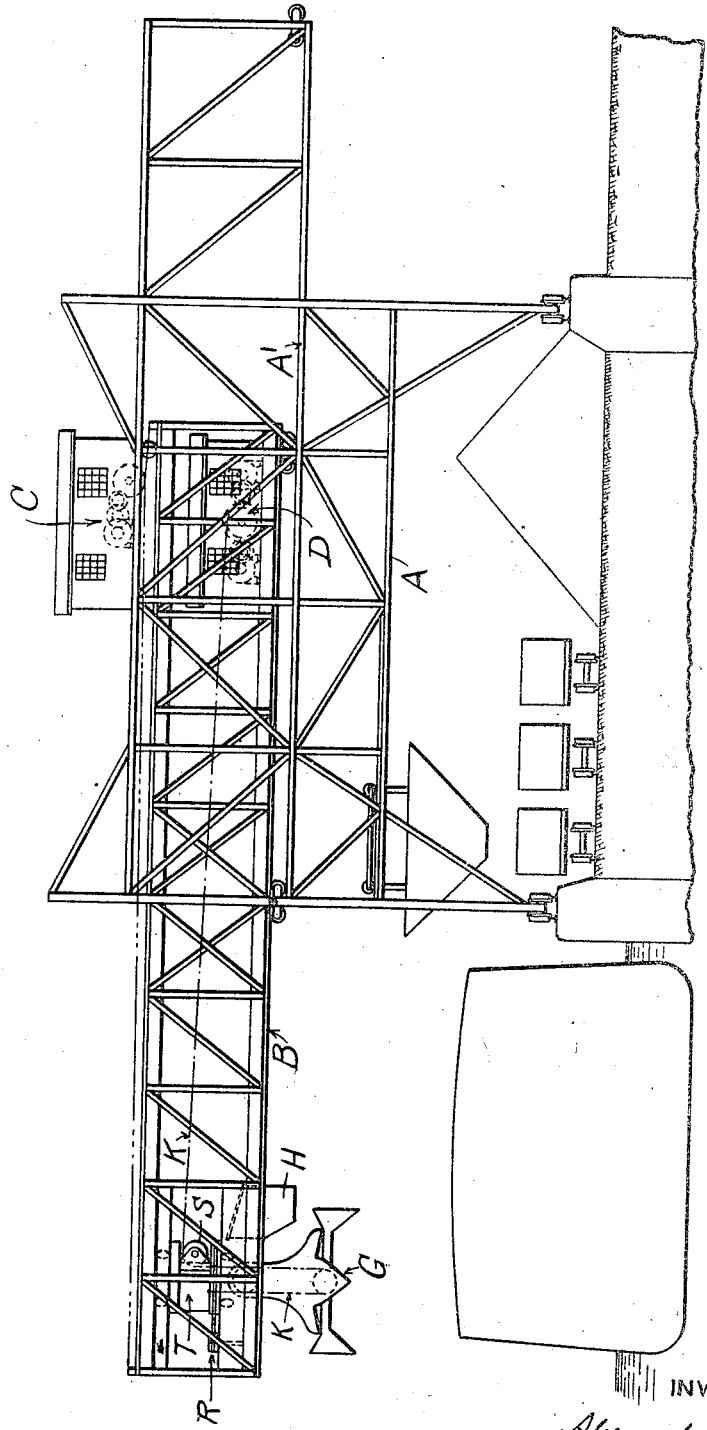

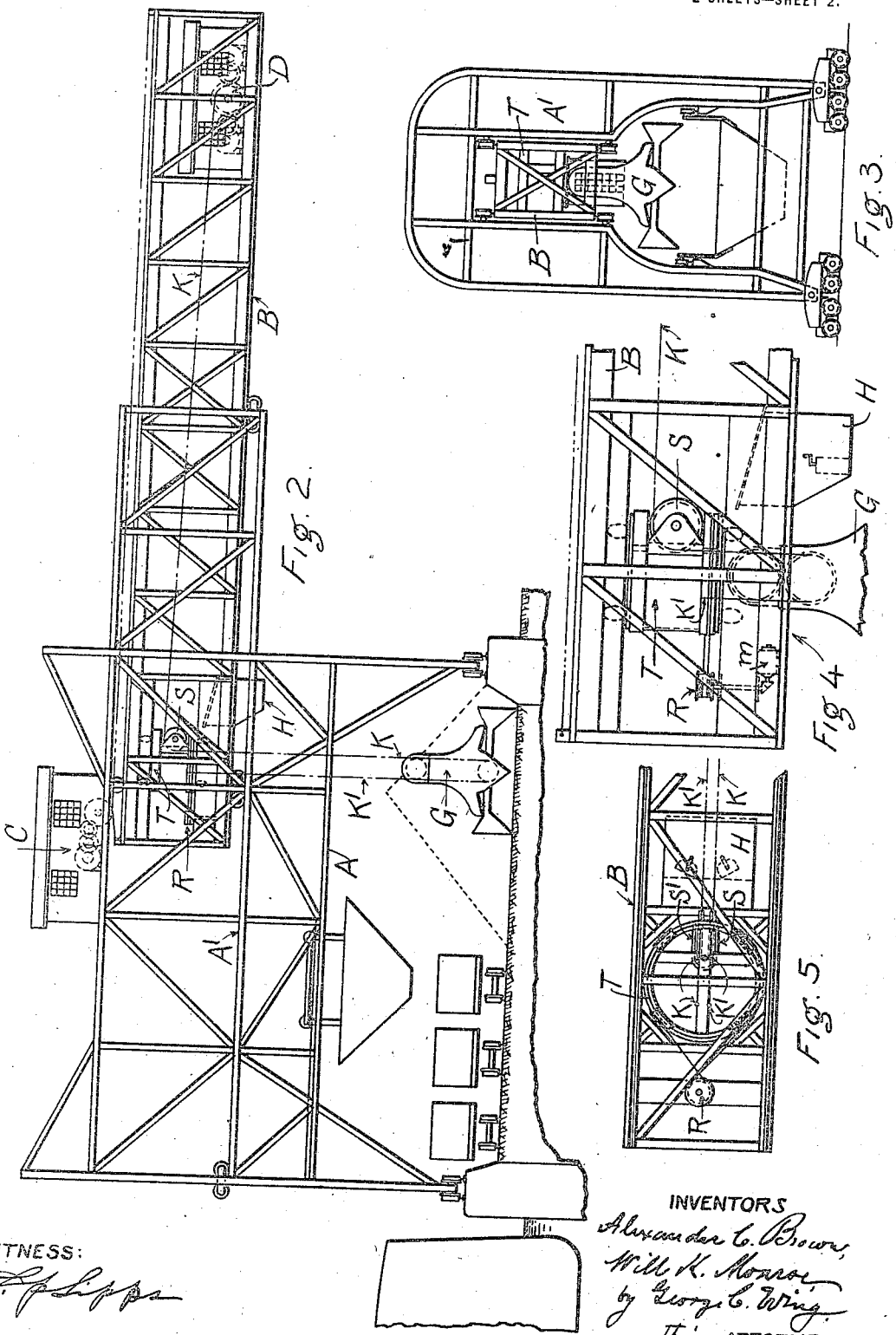

UNITED STATES PATENT OFFICE.

ALEXANDER C. BROWN AND WILL K. MONROE, OF CLEVELAND, OHIO, ASSIGNORS TO THE BROWN HOISTING MACHINERY COMPANY, OF CLEVELAND, OHIO, A CORPORATION.

APPARATUS FOR HANDLING MATERIAL.

1,236,047.  Specification of Letters Patent.  Patented Aug. 7, 1917.

Application filed May 28, 1917. Serial No. 171,466.

*To all whom it may concern:*

Be it known that we, ALEXANDER C. BROWN and WILL K. MONROE, of the city of Cleveland, in the county of Cuyahoga and State of Ohio, have invented certain new and useful Improvements in Apparatus for Handling Material, and hereby declare the following to be a description of the same, which is sufficiently full, clear, and exact to enable any one skilled in the art to which it relates to make and use the invention without other particular information upon the subject.

The invention is concerned with that class of apparatus employed in the loading and unloading of ore, and like material, to or from cars, storage piles and vessels, which comprises, as distinguishing features, a portable base, or supporting structure, a beam which may be reciprocated therethrough, and, a trolley adapted to be traversed along the beam, at the same time, sustaining the ore-buckets, derricks or cranes which constitute the immediate load-carriers of the material to be handled.

In existing devices of this type, so far as we are informed, the sole function of the beam is as a track, or runway, for the trolley, and the only purpose of making the same reciprocable, is, that, as such trackway, it may be accommodated to, and span, the varying distance from the apparatus to the hatches of the vessels to be served, and, be retracted from a water front or other exterior space, when such service has been performed and the plant is to become idle.

It will be manifest that, in a structure of this character, the overturning force which must be taken care of and resisted, calls for a maximum of weight in the base formation, and a minimum of the live load upon the overhanging beam, but, that when man-trolleys, with their concentrated load of motors and mechanisms for the main functions of the bucket and trolley, are used, the strain upon the entire structure requires an exceptional massing of material in every part, which correspondingly enhances the cost both of the original plant, and of its operation and maintenance.

It is the object and aim of our invention to reorganize and coördinate the elements involved, in the class of apparatus referred to, in a manner to break up and advantageously distribute said concentrated load, and thereby materially reduce the weights, strains and wheel-loads of the structure, without, however, in any degree impairing the working efficiency or adding to the costs.

The accompanying drawings are illustrative of the invention, wherein—

Figure 1 is a side-elevation of the machine when its beam is extended outwardly therefrom, Fig. 2, a like elevation, when the beam is retracted to the rear limit of its travel, Fig. 3, a front view of Fig. 1, Fig. 4, a side fragmentary elevation of the forward end of the beam, and, Fig. 5, a plan view of the portion shown in Fig. 4.

A is the apparatus as a whole, $A^1$ being the supporting frame.

B is the reciprocating beam. It is made up, as shown, of two parallel laced-girders, arranged vertically, and united, into the beam construction, by cross-bracing both at the top and bottom. This produces a lighter beam than where lateral bracings are used, as is the case in the beams, open at the lower sides, required in other cranes. The beam B rests on rollers in the usual way.

Machinery for racking the beam forward and back through the supporting frame $A^1$, is mounted on said frame and indicated by C. where also will be located the mechanism for moving the crane along its track.

At a predetermined point near the outer end of the beam B. a grab-bucket G—of the two-rope type in this instance—is suspended from said beam, by its operating cables K and $K^1$. While free, of course, with respect to its vertical and lateral movements, the bucket is firmly held against movement along, or in the direction of the beam. The operating cables K and $K^1$ lead backwardly toward the other, or inner end of the beam, to their drums at D. These drums, and their motors and controlling mechanism, whether electric, steam or hydraulic, are located permanently upon the beam at or near such inner end to thereby, not only relieve the outer portion of the beam of their load, but to serve as a counterweight for said portion. Obviously, such mechanism, as well as the mechanism for racking the beam and traveling the crane along its track, may be operated from a station at or near the immediate location of the same, but,—and particularly when that mechanism is electrically driven—it will be found more advantageous to arrange for its operation, by means of controllers, from some point close to the bucket itself. In the design illustrated, we accordingly, provide a cab H, at such point, for the purpose.

Inasmuch as, in the form of apparatus so far described, the cable-winding drums, and their mechanism—which, in most forms of man-trolleys, are located on the trolley above the point of suspension of the bucket—are permanently located remotely from such bucket, it is plain that an ability to effect all the desired lateral movements of the bucket, must be brought about in some other manner than, as now, by merely rotating the drums and their bucket-suspending ropes. A special arrangement to this end is accordingly set forth, as a needed detail on the apparatus as an operative unit. It is claimed in the general combination both broadly and as shown, and whenever, in an apparatus of the kind in question, a bucket is suspended from the beam within a loop, or loops, of the operative cables, and remotely from the winding drums, any mode of bringing about a rotation of said loops from one vertical plane to another, and thereby turning the suspended bucket, will necessarily be included in the broad idea stated.

The special arrangement referred to appears in Figs. 4 and 5. It consists of a turntable T firmly mounted on the beam B immediately above the bucket G. Said turntable is an upright barrel-shaped frame, rotatably mounted on rollers, whose stated movements are brought about by means of a drum and rope arrangement R, driven by a nearby motor m. S and S¹ are a pair of sheaves caster-mounted or swiveled, as a unit, upon the turntable at one side, and, over these sheaves, the cables K and K¹ lead, from the drums at D, downwardly to and around the sheaves in the bucket, upwardly to fixed points on the turntable T, which are equidistant from the axis of the same, with the downward lead of the cables K and K¹. The bucket is thus held in loops of said cables in line with the vertical axis of the turntable, so that, by rotating the latter around said axis, the loops and their pendant bucket will be turned about said central line to a corresponding degree.

The mode of operation of the apparatus will be apparent from the foregoing explanations, in connection with the drawings. The bucket is hoisted and lowered by the cables and drums in the usual manner, any turning movements required being accomplished by revolving the turntable T. A load, for instance, being grabbed by the bucket, from a vessel, or source of supply, above which it has been carried by an outward movement of the beam B, the bucket and load are wound upwardly to the beam by the drums, and both beam and bucket then moved backwardly in the supporting frame by the mechanism at C, and the load released. The reverse operation then returns the bucket to a position to grab a new load.

Except as expressly claimed we do not intend to limit our invention to the precise dimensions, locations or distributions of the mechanisms and parts shown. The novel ideas involved, for instance, would equally be represented by an apparatus which assigned a part only of the cable-winding mechanism to the place and function of a counterweight, as described, or which made that place short of the extreme inner end of the beam if, nevertheless, such place was remotely related to the place for the bucket on the beams, and, at the same time, was within the supporting frame.

What we claim and wish to secure by Letters Patent is:—

1. In an apparatus for handling material, the combination with a supporting frame, of a beam reciprocable horizontally therethrough, a hoisting appliance at the outer end thereof, mechanism for operating said appliance at a suitable point, toward the inner end, to counterweight said beam when reciprocated outwardly from said frame, together with suitable means of reciprocating the beam through said frame, substantially as shown and described.

2. In an apparatus for handling material, the combination, with a supporting frame, of a beam movable horizontally therethrough, a cable-operated bucket at one end thereof, suitable cable-winding mechanism at the other end, cables for operating said bucket extending between the bucket and said mechanism, said bucket being suspended within a loop or loops of said cables, suitable means for turning said loop or loops from one vertical plane to another, and means for moving the beam horizontally through its supporting frame, substantially as shown and described.

3. In an apparatus for handling material comprising a supporting frame and a beam adapted to be reciprocated therethrough, having a cable operated grab-bucket at its outer end, bucket operating cables, and cable winding drum mechanism for operating said cables located on the beam remotely from said bucket, a means for turning the bucket laterally, consisting of a turntable, affixed to the beam above the bucket, sheaves swivelly attached to one side thereof, and means for rotating said turntable, said cables being led from their said winding mechanism to and over said swiveled sheaves, downwardly, to and around sheaves provided for the purpose in the bucket upwardly therefrom to anchorage points on the turntable opposite to said swiveled sheaves, and equidistant therewith from the axis of said turntable, substantially as shown and described.

ALEXANDER C. BROWN.
WILL K. MONROE.

In presence of—
 MELVIN PATTISON,
 LOUIS P. LIPPS.